United States Patent
Simon, Jr. et al.

(10) Patent No.: US 8,560,204 B2
(45) Date of Patent: Oct. 15, 2013

(54) METHOD AND APPARATUS FOR ARBITRATING TORQUE RESERVES AND LOADS IN TORQUE-BASED SYSTEM

(75) Inventors: Robert C. Simon, Jr., Brighton, MI (US); Christopher E. Whitney, Highland, MI (US); Leonard G. Wozniak, Ann Arbor, MI (US)

(73) Assignee: GM Global Technology Operations LLC

( * ) Notice: Subject to any disclaimer, the term of this patent is extended or adjusted under 35 U.S.C. 154(b) by 1045 days.

(21) Appl. No.: 12/571,715

(22) Filed: Oct. 1, 2009

(65) Prior Publication Data

US 2010/0116250 A1 May 13, 2010

Related U.S. Application Data

(60) Provisional application No. 61/112,473, filed on Nov. 7, 2008.

(51) Int. Cl.
*G06F 17/00* (2006.01)
*G06F 7/00* (2006.01)

(52) U.S. Cl.
USPC .................. 701/102; 701/103; 123/339.11

(58) Field of Classification Search
USPC ................ 123/436, 339.11; 701/103, 102
See application file for complete search history.

(56) References Cited

U.S. PATENT DOCUMENTS

| | | | | |
|---|---|---|---|---|
| 5,463,993 A | * | 11/1995 | Livshits et al. | 123/339.2 |
| 5,495,835 A | * | 3/1996 | Ueda | 123/339.11 |
| 5,662,084 A | * | 9/1997 | Deguchi et al. | 123/339.11 |
| 6,688,282 B1 | * | 2/2004 | Okubo et al. | 123/339.11 |
| 6,915,198 B2 | * | 7/2005 | Phillips et al. | 701/54 |
| 7,171,299 B1 | * | 1/2007 | Stroh | 701/110 |
| 7,300,381 B2 | * | 11/2007 | Badillo et al. | 477/102 |
| 7,822,528 B2 | * | 10/2010 | Whitney et al. | 701/102 |

* cited by examiner

*Primary Examiner* — Stephen K Cronin
*Assistant Examiner* — David Hamaoui (57) ABSTRACT

An engine control system includes an air control module, a spark control module, and a reserves module. The air control module controls a throttle valve of an engine based on an adjusted predicted torque request. The spark control module controls spark timing of the engine based on an adjusted immediate torque request. The reserves module determines an arbitrated reserve based on a maximum one of a minimum reserve and an additive reserve sum. The reserves module also generates the adjusted predicted torque request based on a sum of an arbitrated predicted torque request and a requested reserve, wherein the requested reserve is based on the arbitrated reserve.

18 Claims, 5 Drawing Sheets

METHOD AND APPARATUS FOR ARBITRATING TORQUE RESERVES AND LOADS IN TORQUE-BASED SYSTEM

CROSS-REFERENCE TO RELATED APPLICATIONS

This application claims the benefit of U.S. Provisional Application No. 61/112,473, filed on Nov. 7, 2008. The disclosure of the above application is incorporated herein by reference in its entirety.

FIELD

The present disclosure relates to a torque-based system and more particularly to systems and methods for arbitrating torque reserve requests and loads in a torque-based system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into spark-ignition engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control system includes an air control module, a spark control module, and a reserves module. The air control module controls a throttle valve of an engine based on an adjusted predicted torque request. The spark control module controls spark timing of the engine based on an adjusted immediate torque request. The reserves module determines an arbitrated reserve based on a maximum one of a minimum reserve and an additive reserve sum. The reserves module also generates the adjusted predicted torque request based on a sum of an arbitrated predicted torque request and a requested reserve, wherein the requested reserve is based on the arbitrated reserve.

A method includes controlling a throttle valve of an engine based on an adjusted predicted torque request; controlling spark timing of the engine based on an adjusted immediate torque request; determining an arbitrated reserve based on a maximum one of a minimum reserve and an additive reserve sum; and generating the adjusted predicted torque request based on a sum of an arbitrated predicted torque request and a requested reserve, wherein the requested reserve is based on the arbitrated reserve.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
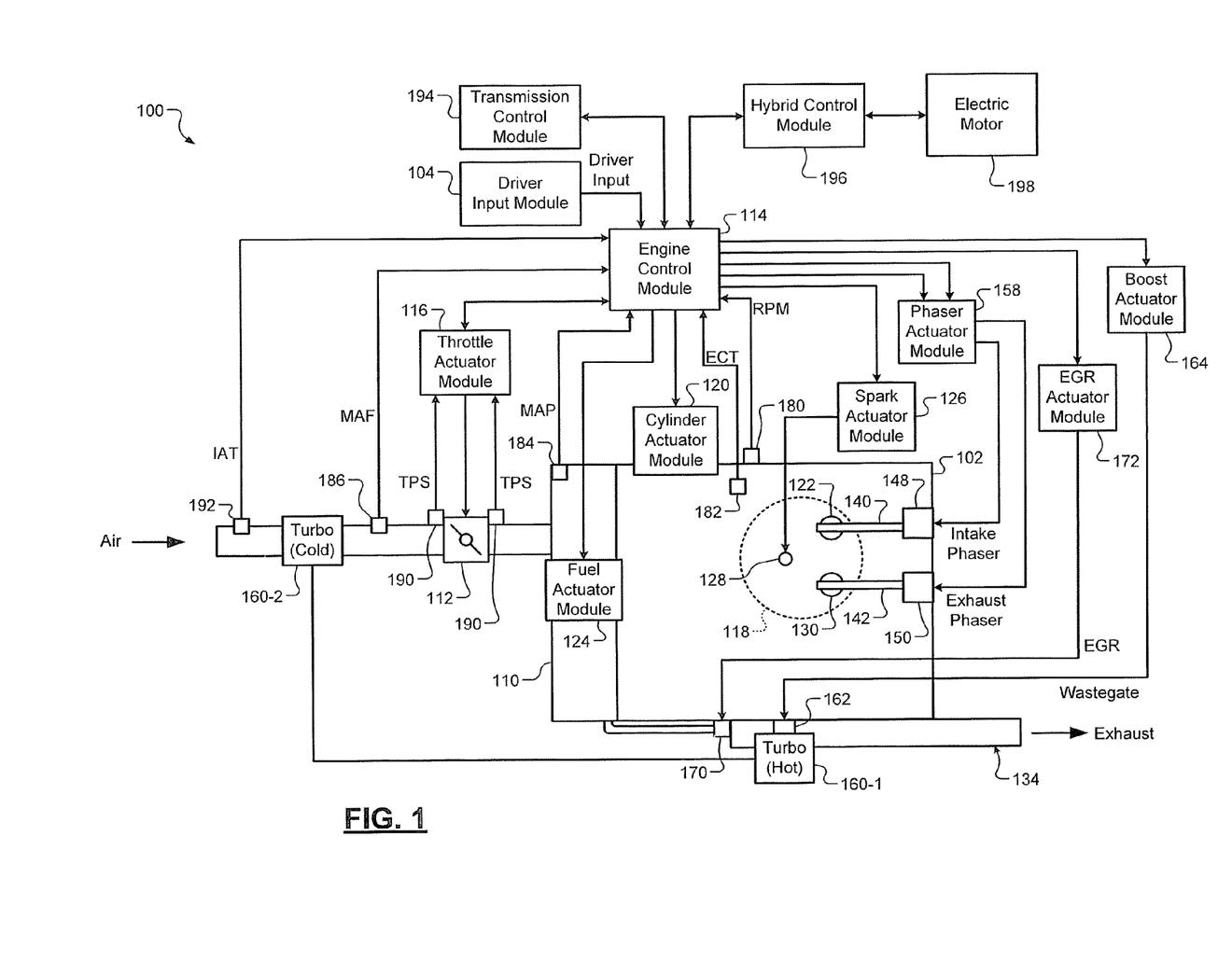
FIG. 1 is a functional block diagram of an exemplary engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
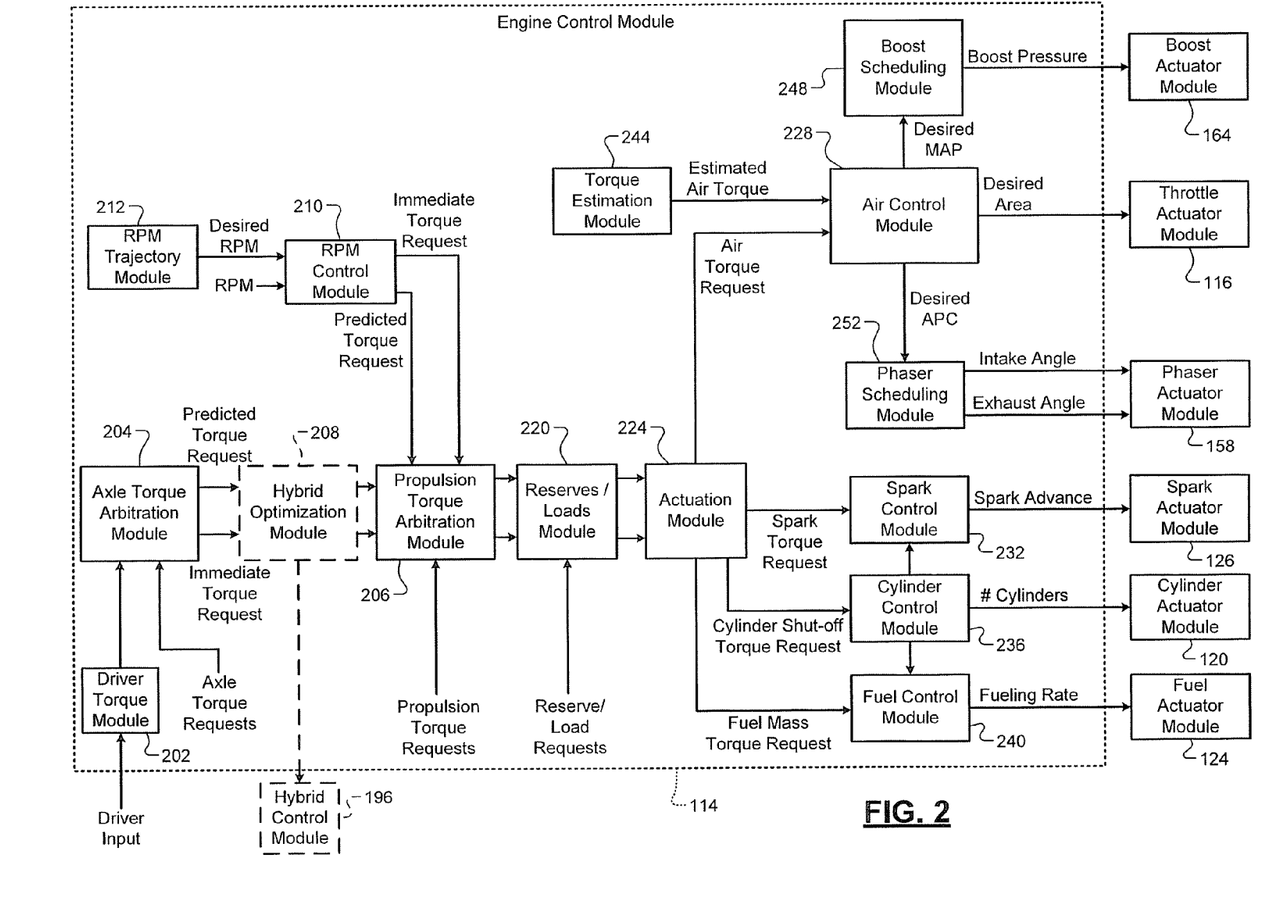
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce engine torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 104 may selectively be adjusted by other modules of the ECM 114 before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to produce an engine output torque equal to the immediate torque request. However, different combinations of actuator values may result in the same engine output torque. The ECM 114 may therefore adjust the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine 102 to the immediate torque request. However, the ECM 114 controls the engine 102 so that the engine 102 can quickly resume producing the predicted torque request once the wheel slip stops.

In general terms, the difference between the immediate torque request and the higher predicted torque request can be referred to as a torque reserve. The torque reserve represents the amount of additional torque that the engine 102 can begin to produce with minimal delay. Fast engine actuators are used to increase or decrease actual engine output torque. As described in more detail below, fast engine actuators are defined in contrast with slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast actuators. For example only, fast actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the top of the range, which is the predicted torque request.

In general terms, fast engine actuators can more quickly change the engine output torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the engine output torque to begin to change once the slow actuator begins to implement the changed actuator value. Generally, this amount of time will be longer for slow actuators than for fast actuators. In addition, even after beginning to change, the engine output torque may take longer to fully respond to a change in a slow actuator.

For example only, the ECM 114 may set actuator values for slow actuators to values that would enable the engine 102 to produce the predicted torque request if the fast actuators were set to appropriate values. Meanwhile, the ECM 114 may set actuator values for fast actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values for one or more fast actuators to values that correspond to the predicted torque request. Because the slow actuator values have already been set based on the predicted torque request, the engine 102 is able to produce the predicted torque request after only the delay imposed by the fast actuators. In other words, the longer delay that would otherwise result from changing engine output torque using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required engine output torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator, while throttle opening area may be a slow actuator. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to the actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the NC compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

An actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuator module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel mass torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current amount of air per cylinder. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease engine output torque. The fuel control module 240 may then determine a fuel mass for each cylinder that achieves the desired air/fuel ratio. In diesel systems, fuel mass may be the primary actuator for controlling engine output torque.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel mass torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des}, APC, I, E, AF, OT, \#) \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 3A:
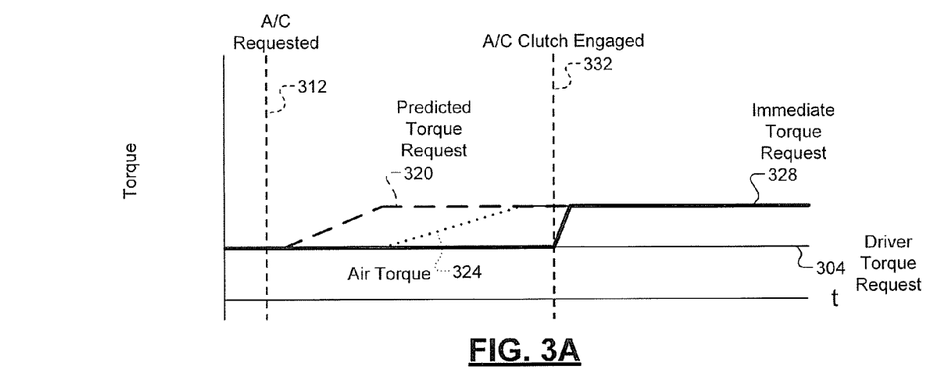
FIGS. 3A-3C are a graphical example of a torque reserve according to the principles of the present disclosure.
Figure 3B:
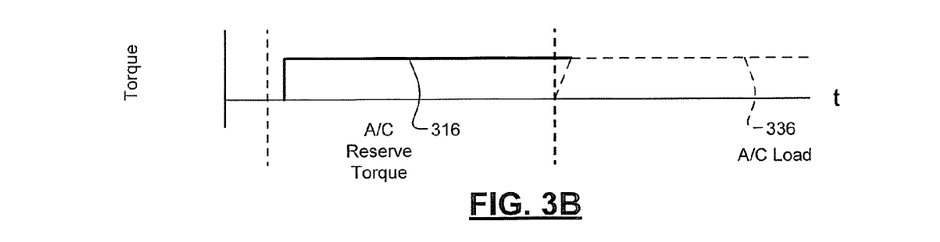
Figure 3C:
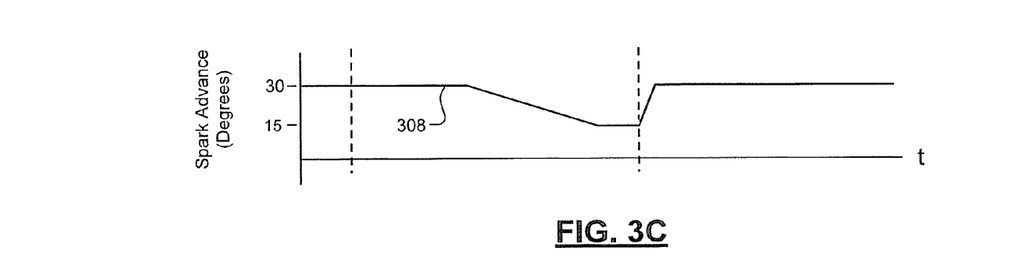

Referring now to FIGS. 3A-3C, a graphical example of a torque reserve is presented. Based on a driver's climate control settings, an air conditioning (A/C) compressor may be turned on or off. For example, the A/C compressor may selectively be connected to a drive pulley by engaging an A/C clutch. The drive pulley may be driven by the crankshaft of the engine 102. When the A/C clutch is engaged, the A/C compressor puts a load on the engine 102.

Engaging the A/C clutch therefore decreases the portion of the engine output torque that is available to turn the engine 102 and drive the wheels. If the engine 102 is idling, the torque produced by the engine 102 may be low, and the torque remaining when the A/C clutch is engaged may not be enough to keep the engine 102 turning at the same speed, resulting in an idle speed sag or even a stall. At higher speeds, the driver may notice a power sag when the A/C clutch is engaged. These problems may be exacerbated because the torque required to start the A/C compressor may be higher than the torque used by the A/C compressor while running.

Therefore, when the A/C clutch is engaged, the engine 102 is controlled to increase the engine output torque to offset the torque now being used to run the A/C compressor. Changing slow actuators, such as air flow, produce result a relatively slow increase in engine output torque. A stall or power sag may already have occurred before the engine output torque has sufficiently increased.

A torque reserve, such as described above, may therefore be implemented prior to engaging the A/C clutch. For example, in a spark-ignition engine, the air flow can be set so that a predicted torque request could be produced. The predicted torque request may be equal to the current engine output torque plus the anticipated load from the A/C compressor. Although the air flow is sufficient to allow the predicted torque request to be produced, the spark timing is retarded by setting the immediate torque request below the air torque so that the engine output torque remains steady.

When the A/C clutch is engaged, the spark advance can be returned to a calibrated value that realizes the full engine output torque available at the current air flow. In other words, the spark retard, which was causing the engine output torque to be reduced, is removed. The entire predicted torque request is available at the current air flow, and therefore sufficient torque is available to offset the load induced by the A/C compressor. Changing spark advance may be realized as a torque increase as soon as the next cylinder firing event occurs.

If the reserve were not present, however, there may be no spark retard to remove to increase engine output torque—instead, additional air flow may be required. Because of the mechanical delay of the throttle valve, the manifold delay of air reaching the cylinders, and the 4-stroke cycle that prevents increased air flow from reaching a cylinder until the next intake stroke, increasing air flow may be relatively slow. Waiting for the additional air flow might cause engine speed and torque sags, which may be noticeable to the user, and in certain circumstances, may even cause the engine to stall.

FIGS. 3A-3C show traces of torque and spark advance with respect to a common time axis. A driver torque request 304 is shown, for purposes of illustration only, as constant throughout the time shown in FIG. 3A. A spark advance 308 is shown, for purposes of illustration only, as 30 degrees at the beginning of the time shown in FIG. 3C.

At time 312, air conditioning is requested by a climate control system. An A/C reserve torque 316 is therefore requested. The A/C reserve torque 316 may be an estimate of the load that the A/C compressor will apply to the engine 102, and may vary based on factors such as temperature.

A predicted torque request 320 may be equal to the driver torque request 304 at time 312. Once the A/C reserve torque 316 is requested, the predicted torque request 320 increases, such as by an amount equal to the A/C reserve torque 316. The predicted torque request 320 may increase at a limited rate, as shown in FIG. 3A, or may increase immediately by the amount of the A/C reserve torque 316.

An air torque 324 follows the predicted torque request 320. As shown in FIG. 3A, there is a delay between the predicted torque request 320 beginning to change and the air torque 324 beginning to change. In addition, by the time the air torque 324 begins to change, the predicted torque request 320 has nearly reached its final value.

An immediate torque request 328 remains equal to the driver torque request 304 until time 332. Therefore, prior to time 332, the engine output torque is equal to the driver torque request 304. As the air torque 324 increases, the spark advance 308 decreases, which maintains the same engine output torque.

At time 332, the A/C clutch engages. An A/C load 336 is generated based on an estimation of the load the A/C compressor applies to the engine 102. The A/C load 336 may be rate-limited, such as is shown in FIG. 3B, or may increase immediately to the estimation of the A/C compressor load. The immediate torque request 328 is increased by the A/C load 336, and therefore increases at time 332. The increase in the immediate torque request 328 dictates an increase in the spark advance 308, which increases engine output torque to match the increased immediate torque request 328.

Because increasing the spark advance 308 is relatively fast, the engine output torque can be increased quickly enough to service the A/C load while reducing or eliminating any power or speed sags. The immediate torque request 328 may remain above the driver torque request 304 as long as the A/C clutch is engaged.

Figure 4:
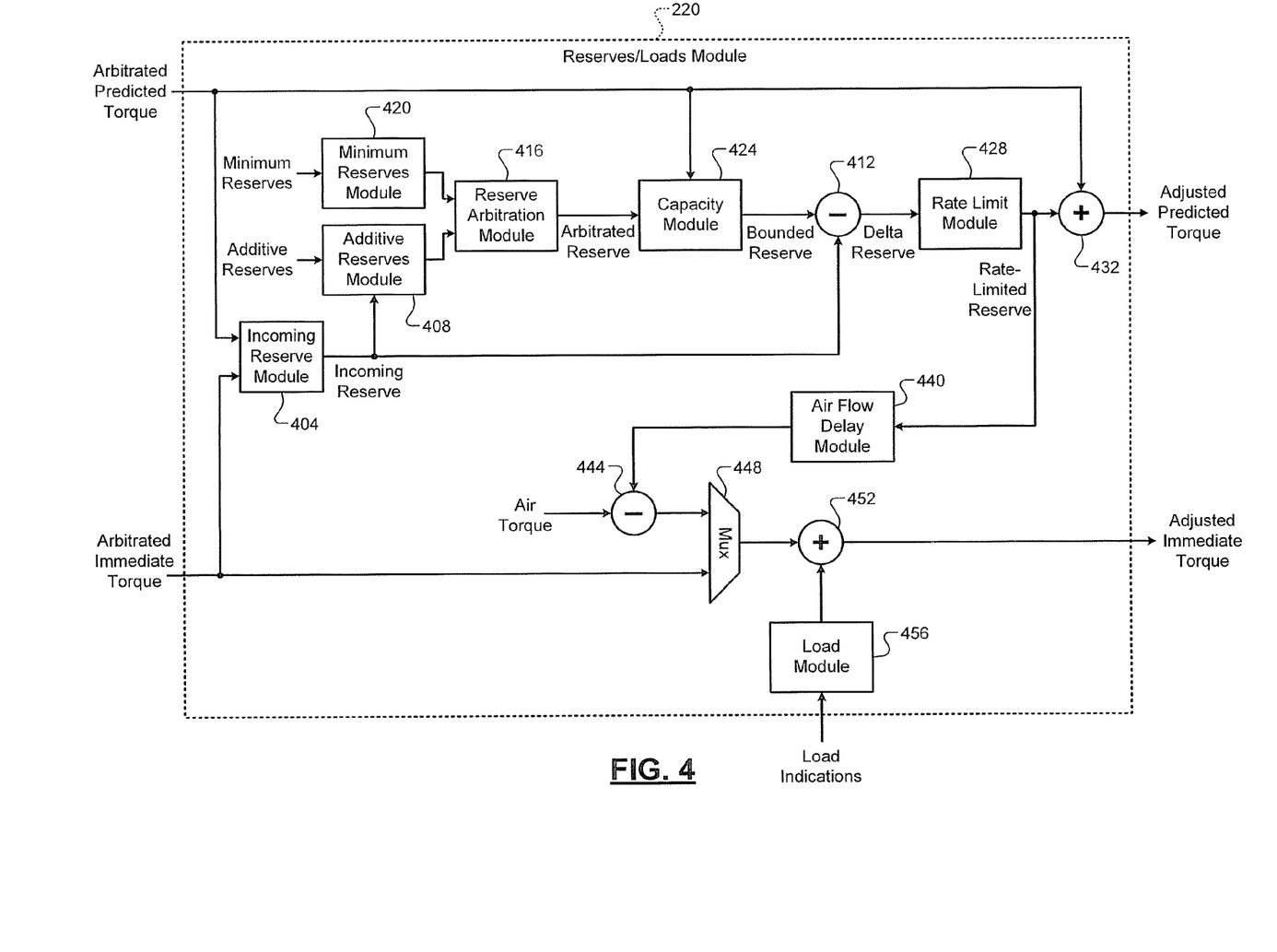
FIG. 4 is an exemplary implementation of the reserves/loads module of FIG. 2 according to the principles of the present disclosure.

Referring now to FIG. 4, an exemplary implementation of the reserves/loads module 220 includes an incoming reserve module 404 that calculates an incoming reserve. The incoming reserve may be based on a difference between the arbitrated predicted torque request and the arbitrated immediate torque request from the propulsion torque arbitration module 206. The incoming reserve module 404 outputs the incoming reserve to an additive reserves module 408 and a subtraction module 412.

The additive reserves module 408 may receive additional additive reserves. Additive reserves may include an A/C compressor reserve, a generator torque compensation reserve, and a diagnostic intrusive equivalence ratio reserve. The incoming reserve may reflect torque reserves such as an idle speed control reserve, a traction control reserve, and a transmission control reserve. The additive reserves module 408 sums any received additive reserves, including the incoming reserve, and outputs the sum to a reserve arbitration module 416.

In various implementations, the idle speed control reserve may be implemented by the RPM control module 210 of FIG. 2 instead of being provided as an additive reserve to the reserves/loads module 220. The RPM control module 210 may implement the idle speed control reserve by outputting a predicted torque request increased by the amount of the idle speed control reserve. When the predicted torque request from the RPM control module 210 wins arbitration in the propulsion torque arbitration module 206, this increase will be reflected by the incoming reserve from the incoming reserve module 404.

A minimum reserves module 420 may receive one or more minimum reserves. In contrast to additive reserves, which each require additional reserve, and are therefore added, minimum reserves are satisfied as long as the specified minimum reserve is present. Therefore, the greatest of the received minimum reserves is selected and output from the minimum reserves module 420. Minimum reserves may include a new engine purging mode reserve and a catalyst light off reserve.

The reserve arbitration module 416 generates an arbitrated reserve based on the reserves received from the additive reserves module 408 and minimum reserves module 420. In various implementations, the reserve arbitration module 416 may output the greater of the values from the additive reserves module 408 and the minimum reserves module 420.

A capacity module 424 determines current capacities, which may include a reserve capacity and a predicted capacity. Reserve capacity is a measure of how much the engine output torque can be reduced using only fast actuators. In various implementations, the reserve capacity may be equal to the spark reserve capacity (a measure of how far the engine output torque can be reduced by fully retarding the spark timing).

Predicted capacity ensures that, by creating the arbitrated reserve, the adjusted predicted torque request is not greater than can be produced by the engine. Predicted capacity may therefore be equal to maximum engine torque at the current engine speed minus the arbitrated predicted torque request. The capacity module 424 applies the reserve capacity and the predicted capacity as upper bounds to the arbitrated reserve and outputs the bounded reserve to the first subtraction module 412.

The first subtraction module 412 outputs a delta reserve based on a difference between the bounded reserve and the incoming reserve. Because the incoming reserve is already incorporated into the arbitrated predicted torque request, the first subtraction module 412 removes the contribution of the incoming reserve before supplying the delta reserve to a rate limit module 428.

The rate limit module applies a rate limit to the delta reserve. For example only, the rate limit module 428 may apply a low pass filter or may limit a rate of change of the delta reserve to a predetermined ramp rate. The rate limit module 428 outputs a rate-limited reserve to a first addition module 432. The first addition module 432 adds the rate-limited reserve to the arbitrated predicted torque request and outputs the result as the adjusted predicted torque request. The rate limit module 428 also outputs the rate-limited reserve to an air flow delay module 440.

The air flow delay module 440 models delays in achieving the rate-limited reserve. Because the rate-limited reserve is reflected in the adjusted predicted torque request, slow actuators may be used to achieve the rate-limited reserve. For example only, air flow may be used. The air flow delay module 440 may model delays in opening the throttle valve 112, delays in increased air flow propagating through the intake manifold 110, and delays between increased air flow being present and an increased amount of air-fuel mixture being combusted during a combustion stroke. The air flow delay module 440 outputs the rate-limited reserve as delayed to a second subtraction module 444.

The output of the air flow delay module 440 is an estimation of how much of the reserve has been realized. In steady state, the output of the air flow delay module 440 will eventually be equal to the rate-limited reserve. The second subtraction module 444 subtracts the delayed rate-limited reserve from air torque and outputs the result to a multiplexer 448. The output of the second subtraction module 444 is therefore the current air torque of the engine 102 adjusted to remove the actual current contribution of the torque allocated to reserves.

The multiplexer 448 outputs one of the arbitrated immediate torque request and the output of the second subtraction module 444 to a second addition module 452. When the multiplexer 448 outputs the arbitrated immediate torque request, this may be referred to as a fast path, where changes in the arbitrated immediate torque request are immediately reflected as changes in the adjusted immediate torque request. When the multiplexer 448 outputs the output from the second subtraction module 444, this may be referred to as a slow path. When the slow path is in effect, changes in the arbitrated immediate torque request are not immediately reflected as changes in the adjusted immediate torque request.

For example only, if the driver suddenly requests more torque, and a large reserve is present, the fast path may allow the adjusted immediate torque request to increase rapidly, resulting in an unexpectedly fast response. Drivers generally expect a slower response by use of a predicted torque request, similar to that experienced when the throttle valve 112 is actuated. The slow path therefore prevents the fast actuators from rapidly changing torque, which may result in a bump in torque that was not expected by the driver.

A load module 456 receives load indications, such as from an A/C compressor clutch. The A/C compressor clutch may indicate to the load module 456 when the A/C compressor clutch engages. The load module 456 generates a load torque based on an estimation of the amount of load that will be applied to the engine 102. In the case of the A/C compressor, the load module 456 outputs the load torque equal to the amount of torque required to run the A/C compressor. This load torque may be summed for various loads, such as the A/C compressor and a power steering pump.

In various implementations, the load module 456 may temporarily increase the load torque while the A/C compressor is starting to reflect the fact that the A/C compressor may require additional torque to start than to continue running. The load module 456 may also adjust the load torque based on temperature, because some components may require more torque to start or operate at lower or higher temperatures. The second addition module 452 sums the output of the multiplexer 448 with the load torque and outputs the result as the adjusted immediate torque request.

Figure 5:
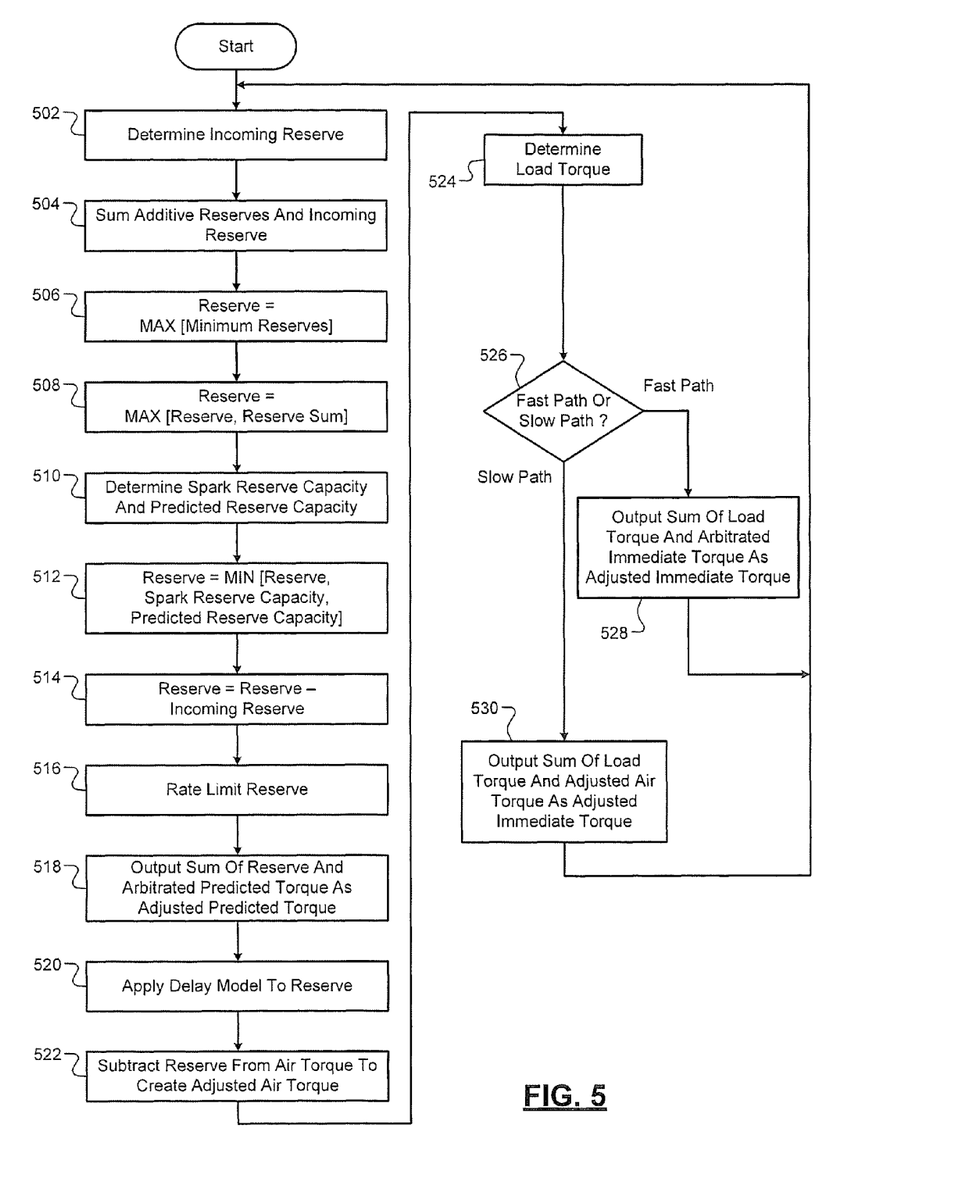
FIG. 5 is a flowchart depicting exemplary operation of the reserves/loads module according to the principles of the present disclosure.

Referring now to FIG. 5, a flowchart depicts exemplary operation of the reserves/loads module 220. Control starts at step 502, where an incoming reserve is determined by subtracting the arbitrated immediate torque request from the arbitrated predicted torque request. Control continues in step 504, where the additive reserves are summed with each other and with the incoming reserve.

Control continues in step 506, where a variable named reserve is set equal to a maximum of received minimum reserves. Control continues in step 508, where the reserve variable is set equal to the maximum of the previous value of the reserve variable and the reserve sum from step 504.

Control continues in step 510, where control determines spark reserve capacity and predicted capacity. Spark reserve capacity is equal to the difference in the torque between air torque and the amount of torque that would be produced if spark timing were set to the most retarded value. Predicted capacity is equal to maximum engine torque at the current engine speed minus the arbitrated predicted torque request.

Control continues in step 512, where control sets the reserve variable to the minimum of the spark reserve capacity, the predicted capacity, and the previous value of the reserve variable. Control continues in step 514, where control sets the reserve variable to be equal to the previous value of the reserve variable minus the incoming reserve. Control continues in step 516, where control rate limits the reserve variable.

Control continues in step 518, where control outputs a sum of the reserve variable and the arbitrated predicted torque request as the adjusted predicted torque request. Control continues in step 520, where control applies a delay model to the reserve variable. The delay model is based on the delays between changes to slower actuators being made and the engine responding to those changes. Control continues in step 522, where control subtracts the reserve variable from the air torque to create an adjusted air torque.

Control continues in step 524, where control determines a load torque. The load torque may be based on loads imposed on the engine, such as an A/C compressor and/or power steering pump. Control continues in step 526, where control selects a fast path or a slow path. For example only, control may select a fast path when RPM control of the engine is enabled. Otherwise, control may select the slow path. In step 526, when the fast path is selected, control transfers to step 528; otherwise, control transfers to step 530. In step 528, control outputs a sum of the load torque and the arbitrated immediate torque request as the adjusted immediate torque request. Control then returns to step 502. In step 530, control outputs a sum of the load torque and the adjusted air torque as the adjusted immediate torque request. Control then returns to step 502.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
an air control module that controls a throttle valve of an engine based on an adjusted predicted torque request;
a spark control module that controls spark timing of the engine based on an adjusted immediate torque request; and
a reserves module that determines an arbitrated reserve based on a maximum one of a first reserve value and a second reserve value, and that generates the adjusted predicted torque request based on a of an arbitrated predicted torque request and a requested reserve,
wherein the first reserve value is a maximum one of a first set of reserve requests,
wherein the second reserve value is a sum of a second set of reserve requests, and
wherein the requested reserve is based on the arbitrated reserve.

2. The engine control system of claim 1 wherein the reserves module generates a delta reserve based on a difference between an intermediate reserve and an incoming reserve, wherein the requested reserve is based on the delta reserve and wherein the intermediate reserve is based on the arbitrated reserve.

3. The engine control system of claim 2 wherein the reserves module generates the requested reserve based on rate limiting the delta reserve.

4. The engine control system of claim 2 wherein the reserves module generates the intermediate reserve by applying an upper limit to the arbitrated reserve, wherein the upper limit is based on an engine output torque difference achievable by the spark control module exclusive of the air control module.

5. The engine control system of claim 2 wherein the reserves module generates the intermediate reserve by applying an upper limit to the arbitrated reserve, wherein the upper limit is based on a difference between a maximum engine output torque achievable by the engine at current engine speed and the arbitrated predicted torque request.

6. The engine control system of claim 2 wherein the reserves module generates the incoming reserve based on a difference between the arbitrated predicted torque request and an arbitrated immediate torque request.

7. The engine control system of claim 6 wherein the reserves module selectively generates the adjusted immediate torque request based on the arbitrated immediate torque request.

8. The engine control system of claim 7 wherein the reserves module selectively generates the adjusted immediate torque request based on a difference between an air torque and a delayed reserve, where the delayed reserve is based on delaying the requested reserve using an air flow delay model, and wherein the air torque is determined based on maximum engine output torque at current air flow.

9. The engine control system of claim 6 wherein the second set of reserve requests includes the incoming reserve.

10. A method comprising:
controlling a throttle valve of an engine based on an adjusted predicted torque request;
controlling spark timing of the engine based on an adjusted immediate torque request;
determining an arbitrated reserve based on a maximum one of a first reserve value and a second reserve value, wherein the first reserve value is a maximum one of a first set of reserve requests, and wherein the second reserve value is a sum of a second set of reserve requests; and generating the adjusted predicted torque request based on a sum of an arbitrated predicted torque request and a requested reserve, wherein the requested reserve is based on the arbitrated reserve.

11. The method of claim 10 further comprising generating a delta reserve based on a difference between an intermediate reserve and an incoming reserve, wherein the requested reserve is based on the delta reserve and wherein the intermediate reserve is based on the arbitrated reserve.

12. The method of claim 11 further comprising generating the requested reserve based on rate limiting the delta reserve.

13. The method of claim 11 further comprising generating the intermediate reserve by applying an upper limit to the arbitrated reserve, wherein the upper limit is based on an engine output torque difference achievable by controlling the spark timing exclusive of controlling the throttle valve.

14. The method of claim 11 further comprising generating the intermediate reserve by applying an upper limit to the arbitrated reserve, wherein the upper limit is based on a difference between a maximum engine output torque achievable by the engine at current engine speed and the arbitrated predicted torque request.

15. The method of claim 11 further comprising generating the incoming reserve based on a difference between the arbitrated predicted torque request and an arbitrated immediate torque request.

16. The method of claim 15 further comprising selectively generating the adjusted immediate torque request based on the arbitrated immediate torque request.

17. The method of claim 16 further comprising selectively generating the adjusted immediate torque request based on a difference between an air torque and a delayed reserve, where the delayed reserve is based on delaying the requested reserve using an air flow delay model, and wherein the air torque is determined based on maximum engine output torque at current air flow.

18. The method of claim 15 wherein the second set of reserve requests includes the incoming reserve.

* * * * *